US009611002B1

(12) United States Patent
Shum et al.

(10) Patent No.: US 9,611,002 B1
(45) Date of Patent: Apr. 4, 2017

(54) MOTORIZED BICYCLE WITH PEDAL REGENERATION WITH AUTOMATIC ASSISTANCE

(71) Applicant: Evantage Ltd, Hong Kong (CN)

(72) Inventors: Henry Shum, Boca Raton, FL (US); Adam Rand, Marblehead, MA (US)

(73) Assignee: Sunluxe Enterprises Limited, Hong Kong (CN)

( * ) Notice: Subject to any disclaimer, the term of this patent is extended or adjusted under 35 U.S.C. 154(b) by 50 days.

(21) Appl. No.: 14/835,724

(22) Filed: Aug. 26, 2015

Related U.S. Application Data

(60) Provisional application No. 62/043,383, filed on Aug. 28, 2014.

(51) Int. Cl.
*B62M 6/40* (2010.01)
*B62M 6/50* (2010.01)
*B62M 6/90* (2010.01)

(52) U.S. Cl.
CPC ................ *B62M 6/50* (2013.01); *B62M 6/90* (2013.01)

(58) Field of Classification Search
CPC . B62M 6/50; B62M 6/90; B62M 6/45; B62M 6/70
See application file for complete search history.

(56) References Cited

U.S. PATENT DOCUMENTS 4,541,500 A * 9/1985 Gelhard .................. B62M 6/70 180/205.2
4,637,274 A * 1/1987 Goldenfeld ............. B62M 6/45 180/206.4
8,602,149 B2 12/2013 Krieger et al.
2014/0062351 A1* 3/2014 Spelta ................ B60L 11/1801 318/139

* cited by examiner

*Primary Examiner* — Mary Cheung
(74) *Attorney, Agent, or Firm* — North Shore Patents, P.C.; Michele Liu Baillie

(57) ABSTRACT

A motorized bicycle includes: a frame; a plurality of wheels coupled to the frame; pedals coupled to the frame for driving at least one of the wheels; a motor coupled to the pedals and at least one of the wheels; a battery for supplying power to the motor; and a controller. When the controller determines that the motorized bicycle is traveling on a flat terrain or a decline, it enters or maintains a regeneration mode, where electric power is generated when a rider of the motorized bicycle pedals, and the electric power is used to charge the battery. When the controller determines that the motorized bicycle is traveling on an incline, it enters or maintains an assistance mode, where any regeneration of the battery is stopped, and power output from the motor is used to assist the rider in propelling the motorized bicycle forward.

21 Claims, 5 Drawing Sheets

MOTORIZED BICYCLE WITH PEDAL REGENERATION WITH AUTOMATIC ASSISTANCE

BACKGROUND OF THE INVENTION

Bicycles exist with motors that propel the bicycle forward. However, many of these motorized bicycles do not offer pedal regeneration and/or remains in the regeneration mode, even when the terrain changes, unless a user manually changes the mode.

SUMMARY OF THE INVENTION

According to one embodiment of the present invention, a motorized bicycle includes: a frame; a plurality of wheels coupled to the frame; a plurality of pedals coupled to the frame for driving at least one of the plurality of wheels; a motor coupled to the pedals and at least one of the plurality of wheels; a battery for supplying power to the motor; and a controller. In response to determining that the motorized bicycle is traveling on a flat terrain or on a decline, the controller enters or maintains a regeneration mode. In the regeneration mode, electric power is generated when a rider of the motorized bicycle pedals, and the electric power is used to charge the battery. In response to determining that the motorized bicycle is traveling on an incline, the controller enters or maintains an assistance mode. In the assistance mode, any regeneration of the battery is stopped, and power output from the motor is used to assist the rider in propelling the motorized bicycle forward.

In one aspect of the present invention, the motorized bicycle further includes: a device for measuring a speed of the motorized bicycle; and a sensor unit comprises one or more sensors for detecting a pedaling cadence of the motorized bicycle.

In one aspect of the present invention, the device includes a speedometer for measuring a wheel speed of at least one of the plurality of wheels.

In one aspect of the present invention, the device includes a Global Positioning System (GPS).

In one aspect of the present invention, the controller detects a decrease in the speed via the device and detects a constant pedaling cadence, optionally with no change in gears, via the sensor unit. In response, the controller enters or maintains the assistance mode.

In one aspect of the present invention, the controller detects a constant speed via the device and detects no change in the pedaling cadence via the sensor unit. In response, the controller enters or maintains the regeneration mode.

In one aspect of the present invention, the controller detects an increase in the speed, optionally with no change in gears, via the device and detects a decrease in the pedaling cadence via the sensor unit. In response, the controller enters or maintains the regeneration mode.

In one aspect of the present invention, the motorized bicycle further includes an interface between the controller and one or more biometric sensors. The controller further obtains one or more measurements from the one or more biometric sensors. In response to determining that the one or more measurements fail to meet a first predetermined threshold, the controller enters or maintains the regeneration mode. In response to determining that the one or more measurements meet or exceed a second predetermined threshold, the controller enters or maintains the assistance mode.

In one aspect of the present invention, the motorized bicycle further includes an altimeter or one or more tilt sensors, where the controller determines, via the altimeter or the one or more tilt sensors, whether the motorized bicycle is traveling on the flat terrain, on the decline, or on the incline.

According to another embodiment of the present invention, a method for controlling a mode of operation of a motorized bicycle includes: determining, by a controller coupled to the motorized bicycle, a speed of the motorized bicycle and a pedaling cadence of the motorized bicycle; determining, by the controller, whether the motorized bicycle is traveling on a flat terrain, a decline, or an incline based on the speed and the pedaling cadence; in response to determining that the motorized bicycle is traveling on the flat terrain or on the decline, entering or maintaining a regeneration mode by the controller, and in response to determining that the motorized bicycle is traveling on the incline, entering or maintaining an assistance mode by the controller.

According to another embodiment of the present invention, a computer readable medium has computer readable program code embodied therein, where when executed by a processor causes the processor to determine a speed of the motorized bicycle and a pedaling cadence of the motorized bicycle, and determine whether the motorized bicycle is traveling on a flat terrain, a decline, or an incline based on the speed and the pedaling cadence. In response to determining that the motorized bicycle is traveling on the flat terrain or on the decline, enter or maintain a regeneration mode. In the regeneration mode, electric power is generated when a rider of the motorized bicycle pedals, and the electric power is used to charge the battery. In response to determining that the motorized bicycle is traveling on the incline, enter or maintain an assistance mode. In the assistance mode, any regeneration of the battery is stopped, and the power output from the motor is used to assist the rider in propelling the motorized bicycle forward.

DETAILED DESCRIPTION OF THE INVENTION

Figure 1A:
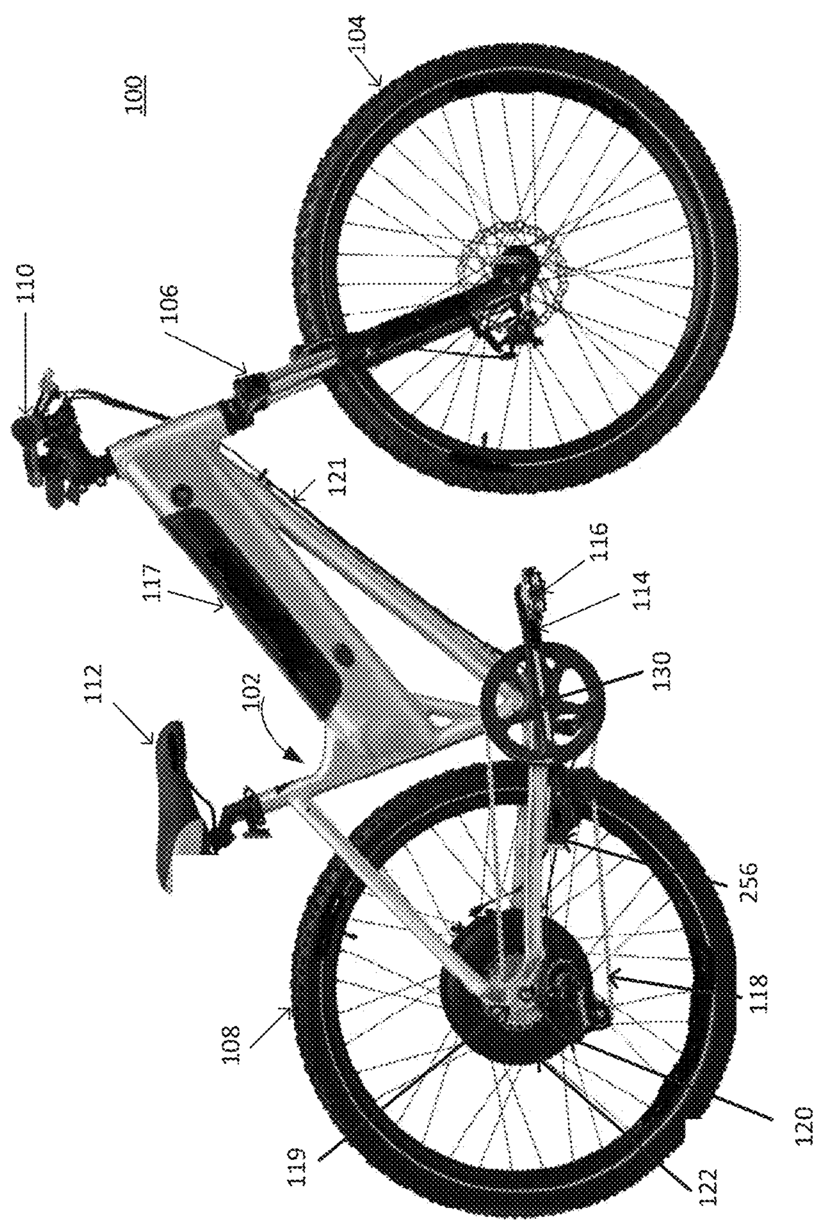
FIGS. 1A-1B illustrate a motorized bicycle according to embodiments of the present invention.

The following description is presented to enable one of ordinary skill in the art to make and use the present invention and is provided in the context of a patent application and its requirements. Various modifications to the embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention can take the form of an entirely hardware embodiment, an entirely software embodiment or an embodiment containing both hardware and software elements. Furthermore, the present invention can take the form of a computer program product accessible from a computer usable or computer readable storage medium providing program code for use by or in connection with a computer or any instruction execution system. For the purposes of this description, a computer usable or computer readable storage medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Input/output or I/O devices (including but not limited to keyboards, displays, point devices, etc.) can be coupled to the system either directly or through intervening I/O controllers.

The flowchart and block diagrams in the Figures illustrate the architecture, functionality, and operation of possible implementations of systems and methods according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

FIG. 1A illustrates a motorized bicycle according to embodiments of the present invention. In the embodiment illustrated in FIG. 1, the bicycle 100 can generally include a frame 102, a front wheel 104 supported by the frame 102, for example, using a front fork 106, and a rear wheel 108 supported by the frame 102. Optionally, the bicycle 100 may include a third wheel (not shown) coupled to the frame 102. The bicycle 100 can further include handlebars 110 coupled to the front wheel 104, for example, through the front fork 106, to provide steering of the front wheel 104. Additionally, the bicycle 100 can include a seat 112 to support the rider. The bicycle 100 can also include a crank 114 with pedals 116, which can be turned by the rider to turn the rear wheel 108, for example, through a belt or chain 118, or other power transmission device. The position of the belt/chain 118 on the rings coupled to the crank 114 and the rings 119 coupled to the rear wheel 108 provide multiple gears. The bicycle 100 can further include a control system which includes a power source, such as a battery 117, and a controller (hidden) that delivers electric power from the battery 117 to an electric motor 122. Here, the battery 117 is mid-mounted to the frame 102, for example, in the top tube, but may be located elsewhere on the bicycle 100. The electric motor 122 may be coupled to the hub of the rear wheel 108 (as illustrated), the hub of the front wheel 104, or to a center mount 130. The motor 122 drives one or more of the wheels 104, 108. As illustrated in FIG. 1A, the motor 122 drives the rear wheel 108.

Figure 1B:
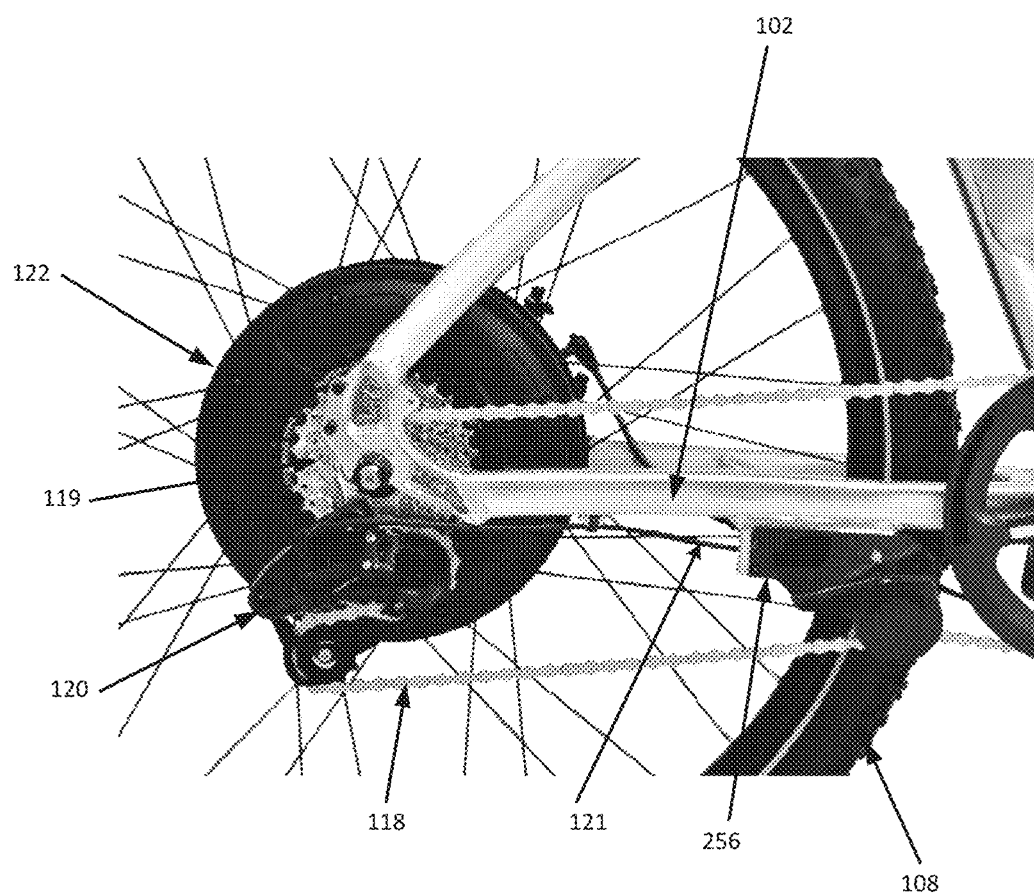

FIG. 1B illustrates in more detail the gears of the bicycle 100 at the rear wheel according to embodiments of the present invention. The gears at the rear wheel include the belt/chain 118, the rings 119, the derailleur 120, and the cable 121. As the rider changes the gear of the bicycle 100 via a shifter (not shown), the cable 121 coupled to the shifter and the derailleur 120 causes the derailleur 120 to move, which in turn moves the belt/chain 118 to the ring 119 corresponding to the selected gear. A sensor unit 256, with one or more sensors, is coupled to the frame 102 with portions of the cable 121 and the chain 118 residing in the sensor unit 256. One or more sensors in the sensor unit 256 detects a pedaling cadence and/or gear of the bicycle 100. FIG. 1B illustrates gears provided by an external cassette, however, other types of gears may also be used without departing from the spirit and scope of the present invention, including but not limited to freewheels and internal geared hubs with mechanical or electrical shifting mechanisms.

Figure 2:
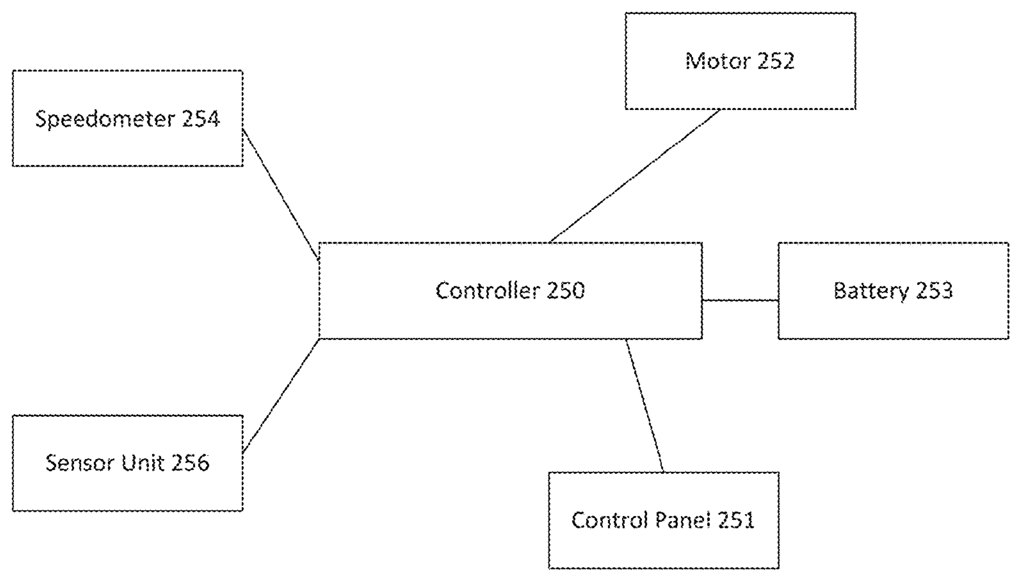
FIG. 2 illustrates in more detail the control system of the motorized bicycle according to embodiments of the present invention.

FIG. 2 illustrates in more detail the control system of the motorized bicycle according to embodiments of the present invention. The control system includes the controller 250 coupled to a control panel 251, the motor 252, and the battery 253. The controller 250 further interfaces with a speedometer 254 for measuring a speed of the bicycle 100, such as by measuring a wheel speed of the rear wheel 108, and a sensor unit 256 with one or more sensors for detecting a pedaling cadence. In this embodiment, the chain 118 moves through the sensor unit 256, and the sensor unit 256 detects the pedaling cadence by measuring the speed at which the chain 118 moves through the sensor unit 256. In this embodiment, the bicycle 100 has a regeneration mode and an assistance mode. In the regeneration mode, when the rider pedals, electric power is generated which is used to charge the battery 253. In the regeneration mode, the motor 252 applies a predetermined amount of resistance to the bicycle 100, such that more effort is required to propel the bicycle 100. In the assistance mode, any regeneration of the battery 253 is stopped, and power is output from the motor 252 to assist the rider in propelling the bicycle 100 forward. When the controller 250 determines that the bicycle 100 is traveling on an incline, the controller 250 automatically, without intervention by a user, exits the regeneration mode (if applicable) and enters or maintains the assistance mode. When the controller 250 determines that the bicycle 100 is traveling on flat terrain or on a decline (or alternatively a user engages the brakes, such as by tapping the brakes), the controller 250 automatically, without intervention by a user, exits the assistance mode (if applicable) and enters or maintains the regeneration mode.

Figure 3:
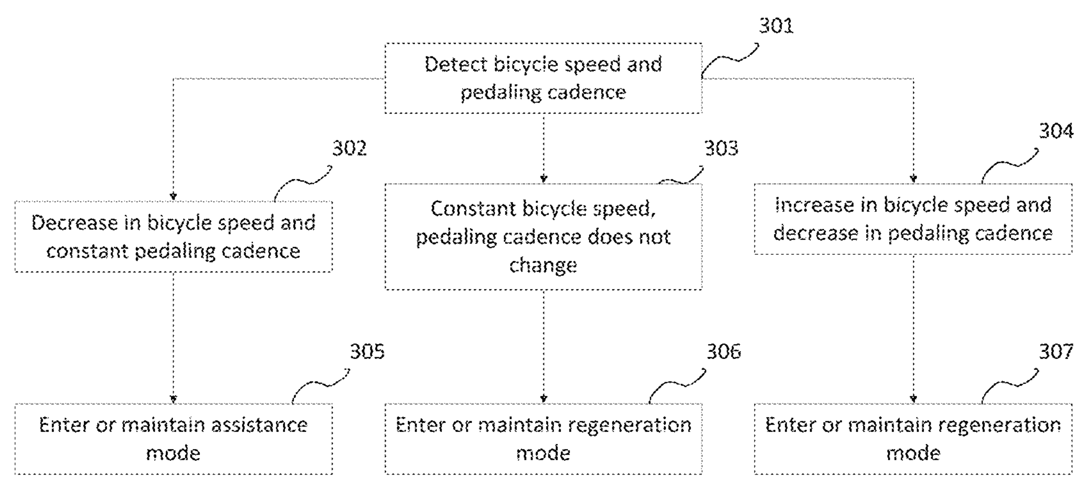
FIG. 3 is a flowchart illustrating a method of controlling a mode of operation of a motorized bicycle according to embodiments of the present invention.

FIG. 3 is a flowchart illustrating a method of controlling a mode of operation of a motorized bicycle according to embodiments of the present invention. First, the controller detects the bicycle speed and the pedaling cadence (301). In this embodiment, the bicycle speed is detected via the speedometer 254 by measuring the wheel speed, but other manners of detecting the speed of the bicycle may be used, such as through the use of a Global Positional System (GPS). In this embodiment, the pedaling cadence is detected via the sensor unit 256 by measuring the speed at which the chain 118 moves through the sensor unit 256. When the controller detects a decrease in the bicycle speed and a constant pedaling cadence, optionally with no change in gears (302), the controller 250 determines that the bicycle 100 is traveling on an incline and automatically enters or maintains the assistance mode (305). If the bicycle 100 is currently in the regeneration mode, then the controller 250 exits the regeneration mode and enters the assistance mode. If the bicycle 100 is currently in the assistance mode, then the controller 250 maintains the assistance mode. When the controller 250 detects the bicycle speed as constant and does not detect a change in the pedaling cadence (303), the controller 250 determines that the bicycle 100 is on flat terrain and enters or maintains the regeneration mode (306). When the controller 250 detects an increase in the bicycle speed, optionally with no change in gears, and a decrease in the pedaling cadence, (304), the controller 250 determines that the bicycle 100 is on a decline and enters or maintains the regeneration mode (307).

Optionally, one or more tilt sensors or an altimeter may be coupled to the bicycle 100 via which the controller 250 detects whether the bicycle 100 is traveling on an incline, flat terrain, or decline. Here, when the controller 250 detects via the tilt sensors or altimeter that the bicycle 100 is traveling on an incline within a first predetermined angle or degree, the controller 250 automatically, without intervention by a user, exists the regeneration mode (if applicable) and enters or maintains the assistance mode. When the controller 250 detects via the tilt sensor or altimeter that the bicycle 100 is traveling on flat terrain or on a decline within a second predetermined angle or degree, the controller 250 automatically, without intervention by a user, exists the assistance mode (if applicable) and enters or maintains the regeneration mode. The first and/or second predetermined angles or degrees may be a tunable parameter, set by a user, manufacturer, or retailer.

Optionally, the controller 250 comprises an interface for communicating with one or more biometric sensors, and the controller 250 obtains measurements from the biometric sensors and uses the measurements in determining whether or not to enter or maintain the assistance or regeneration mode. Biometric sensors may be worn or otherwise attached to the rider or the bicycle 100 at any location corresponding to the desired biometric reading. The controller 250 may interface with the biometric sensors through wireless or wired interfaces, including but not limited to Bluetooth™, Universal Serial Bus (USB), and Apple Lightning™. The controller 250 may communicate with the biometric sensors directly, via an application running on a mobile device, or in other direct or indirect ways. For example, a heartrate monitor may be worn on a rider's chest, wrist, arm, or clothing. The controller 250 may be configured to enter or maintain the regeneration mode when the bicycle 101 is determined to be traveling on an incline and the biometric sensor measurements fail to meet a first predetermined threshold. The controller 250 may be configured to enter or maintain the assistance mode when the bicycle 101 is determined to be traveling on flat terrain or a decline and the biometric sensors measurements meet or exceed a second predetermined threshold. For example, when the controller 250 determines that the bicycle 100 is traveling on an incline as described above, and the rider's heartrate is measured to be below a target heartrate, the controller 250 may be configured to enter or maintain the regeneration mode. By entering or maintaining the regeneration mode here, resistance is applied to the bicycle, giving the rider an opportunity to increase the heartrate to the target heartrate. When the controller 250 determines that the bicycle 100 is traveling on flat terrain or a decline as described above, and the rider's heartrate is measured to be above a target heartrate, the controller 250 may be configured to enter or maintain the assistance mode. By entering or maintaining the assistance mode, the resistance applied by the regeneration mode is avoided, giving the rider a better opportunity to recover and/or reduce the heartrate. Other biometric readings, alone or in combination, may be used in this manner. The biometric readings may further be used in conjunction with predetermine fitness program(s), such as programs for training or rehabilitation.

Figure 4:
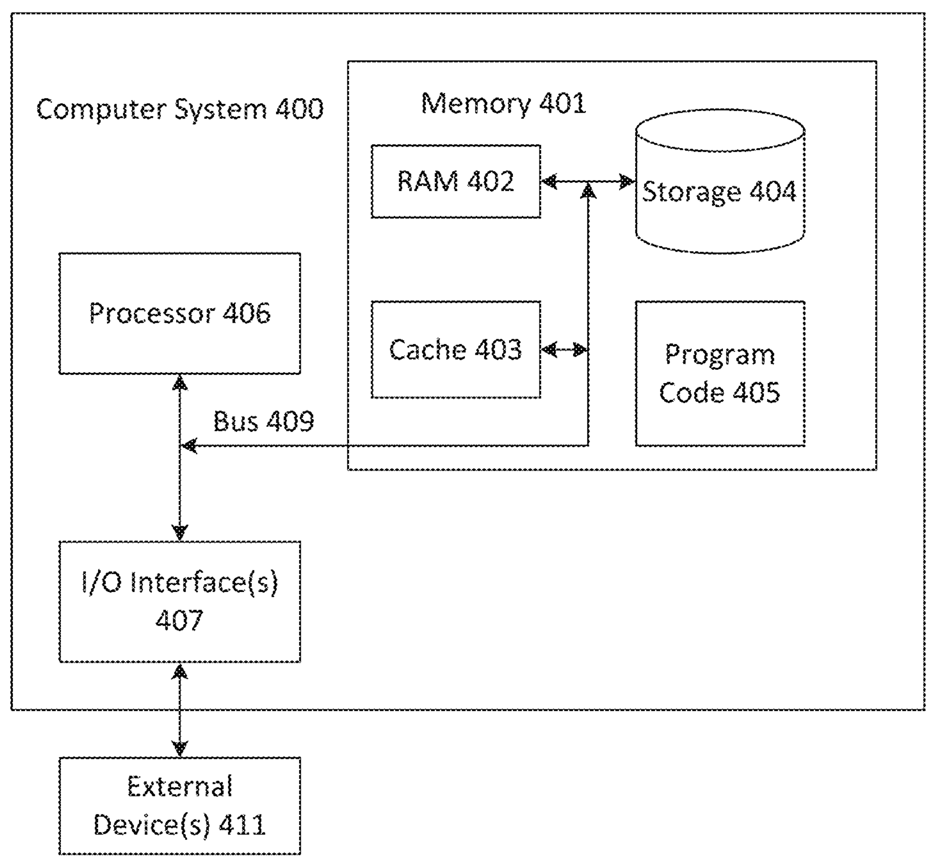
FIG. 4 illustrates a computing system according to embodiments of the present invention.

In one embodiment, the controller 250 comprises a computing system as illustrated in FIG. 4. The computing system 400 is operationally coupled to a processor or processing units 406, a memory 401, and a bus 409 that couples various system components, including the memory 401 to the processor 406. The bus 409 represents one or more of any of several types of bus structure, including a memory bus or memory controller, a peripheral bus, an accelerated graphics port, and a processor or local bus using any of a variety of bus architectures. The memory 401 may include computer readable media in the form of volatile memory, such as random access memory (RAM) 402 or cache memory 403, or non-volatile storage media 404. The memory 401 may include at least one program product having a set of at least one program code module 405 that are configured to carry out the functions of embodiment of the present invention when executed by the processor 406. The computing system 400 may also communicate with one or more external devices 411 via I/O interfaces 407.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A motorized bicycle, comprising:

a frame;

a plurality of wheels coupled to the frame;

a plurality of pedals coupled to the frame for driving at least one of the plurality of wheels;

a motor coupled to the pedals and at least one of the plurality of wheels;

a battery for supplying power to the motor; and a controller that, in response to determining that the motorized bicycle is traveling on a flat terrain or on a decline, enters or maintains a regeneration mode, wherein in the regeneration mode, electric power is generated when a rider of the motorized bicycle pedals, and the electric power is used to charge the battery, wherein in response to determining that the motorized bicycle is traveling on an incline, the controller enters or maintains an assistance mode, wherein in the assistance mode, any regeneration of the battery is stopped, and power output from the motor is used to assist the rider in propelling the motorized bicycle forward.

2. The motorized bicycle of claim 1, further comprising:

a device for measuring a speed of the motorized bicycle; and a sensor unit comprising one or more sensors for detecting a pedaling cadence of the motorized bicycle.

3. The motorized bicycle of claim 2, wherein the device comprises a speedometer for measuring a wheel speed of at least one of the plurality of wheels.

4. The motorized bicycle of claim 2, wherein the device comprises a Global Positioning System (GPS).

5. The motorized bicycle of claim 2, wherein the controller detects a decrease in the speed via the device and detects a constant pedaling cadence via the sensor unit, wherein in response, the controller enters or maintains the assistance mode.

6. The motorized bicycle of claim 2, wherein the controller detects a constant speed via the device and detects no change in the pedaling cadence via the sensor unit, wherein in response, the controller enters or maintains the regeneration mode.

7. The motorized bicycle of claim 2, wherein the controller detects an increase in the speed via the device and detects a decrease in the pedaling cadence via the sensor unit, wherein in response, the controller enters or maintains the regeneration mode.

8. The motorized bicycle of claim 1, further comprising an interface between the controller and one or more biometric sensors, wherein the controller further:

obtains one or more measurements from the one or more biometric sensors;

in response to determining that the one or more measurements fail to meet a first predetermined threshold, enters or maintains the regeneration mode; and in response to determining that the one or more measurements meet or exceed a second predetermined threshold, enters or maintains the assistance mode.

9. The motorized bicycle of claim 1, further comprising an altimeter or one or more tilt sensors, wherein the controller determines, via the altimeter or the one or more tilt sensors, whether the motorized bicycle is traveling on the flat terrain, on the decline, or on the incline.

10. A method for controlling a mode of operation of a motorized bicycle, comprising:

(a) determining, by a controller coupled to the motorized bicycle, a speed of the motorized bicycle and a pedaling cadence of the motorized bicycle;

(b) determining, by the controller, whether the motorized bicycle is traveling on a flat terrain, a decline, or an incline based on the speed and the pedaling cadence;

(c) in response to determining that the motorized bicycle is traveling on the flat terrain or on the decline, entering or maintaining a regeneration mode by the controller, wherein in the regeneration mode, electric power is generated when a rider of the motorized bicycle pedals, and the electric power is used to charge the battery; and (d) in response to determining that the motorized bicycle is traveling on the incline, entering or maintaining an assistance mode by the controller, wherein in the assistance mode, any regeneration of the battery is stopped, and the power output from the motor is used to assist the rider in propelling the motorized bicycle forward.

11. The method of claim 10, wherein the determining (b) and the entering or maintaining (d) comprises:

(b1) detecting, by the controller, a decrease in the speed and a constant pedaling cadence; and (d1) in response, entering or maintaining the assistance mode by the controller.

12. The method of claim 10, wherein the determining (b) and the entering or maintaining (c) comprising:

(b1) detecting, by the controller, a constant the speed and no change in the pedaling cadence; and (c1) in response, entering or maintaining the regeneration mode by the controller.

13. The method of claim 10, wherein the determining (b) and the entering or maintaining (c) comprising:

(b1) detecting, by the controller, an increase in the speed and a decrease in the pedaling cadence; and (c1) in response, entering or maintaining the regeneration mode by the controller.

14. The method of claim 10, wherein the controller comprises an interface with one or more biometric sensors, wherein the method further comprises:

(e) obtaining, by the controller, one or more measurements from the one or more biometric sensors;

(f) in response to determining that the one or more measurements fail to meet a first predetermined threshold, entering or maintaining the regeneration mode by the controller; and (g) in response to determining that the one or more measurements meet or exceed a second predetermined threshold, entering or maintaining the assistance mode by the controller.

15. The method of claim 10, wherein the motorized bicycle comprises an altimeter or one or more tilt sensors, wherein the determining (b) comprises:

(b1) determining, by the controller, whether the motorized bicycle is traveling on the flat terrain, the decline, or the incline based on measurements by the altimeter or the one or more tilt sensors.

16. A computer readable medium comprising computer readable program code embodied therein, wherein when executed by a processor causes the processor to:

(a) determine a speed of the motorized bicycle and a pedaling cadence of the motorized bicycle;

(b) determine whether the motorized bicycle is traveling on a flat terrain, a decline, or an incline based on the speed and the pedaling cadence;

(c) in response to determining that the motorized bicycle is traveling on the flat terrain or on the decline, enter or maintain a regeneration mode, wherein in the regeneration mode, electric power is generated when a rider of the motorized bicycle pedals, and the electric power is used to charge the battery; and (d) in response to determining that the motorized bicycle is traveling on the incline, enter or maintain an assistance mode, wherein in the assistance mode, any regeneration of the battery is stopped, and the power output from the motor is used to assist the rider in propelling the motorized bicycle forward.

17. The medium of claim 16, wherein the determine (b) and the enter or maintain (d) comprises:

(b1) detect a decrease in the speed and a constant pedaling cadence; and (d1) in response, entering or maintaining the assistance mode.

18. The medium of claim 16, wherein the determine (b) and the enter or maintain (c) comprising:

(b1) detect a constant the speed and no change in the pedaling cadence; and (c1) in response, enter or maintain the regeneration mode.

19. The medium of claim 16, wherein the determine (b) and the enter or maintain (c) comprising:

(b1) detect an increase in the speed, a decrease in the pedaling cadence; and (c1) in response, enter or maintain the regeneration mode by the controller.

20. The medium of claim 16, wherein the processor is further caused to:

(e) obtain one or more measurements from the one or more biometric sensors;

(f) in response to determining that the one or more measurements fail to meet a first predetermined threshold, enter or maintain the regeneration mode; and (g) in response to determining that the one or more measurements meet or exceed a second predetermined threshold, enter or maintain the assistance mode.

21. The medium of claim 16, wherein the determine (b) comprises:

(b1) determine whether the motorized bicycle is traveling on the flat terrain, the decline, or the incline based on measurements by an altimeter or one or more tilt sensors.

* * * * *